United States Patent Office 3,082,128
Patented Mar. 19, 1963

3,082,128
METHOD FOR REDUCING COMBUSTION CHAMBER DEPOSITS IN INTERNAL COMBUSTION ENGINES
Willis G. Craig, Willoughby, Ohio, assignor to The Lubrizol Corporation, Wickliffe, Ohio, a corporation of Ohio
No Drawing. Filed Feb. 15, 1960, Ser. No. 8,531
6 Claims. (Cl. 148—6.15)

The present invention relates as indicated to a method for reducing combustion chamber deposits in internal combustion engines. It relates particularly to a method for so reducing such deposits in spark ignition engines. The accumulation of deposits, particularly in the combustion chamber head of a spark ignition engine produces many undesirable results and it is accordingly very desirable to prevent or at least diminish such accumulation. One such result is an increase in the octane requirement of an engine. Thus upon the accumulation of an appreciable amount of such deposits an engine will require a gasoline having an increased octane number. This is of course undesirable because the cost of gasoline varies directly with its octane number.

During operation of the engine, the accumulation of deposits in the combustion chamber head acts to increase the compression ratio and thereby necessitate the use of a fuel of higher octane number than the original fuel if knocking is to be avoided. The octane requirement of a deposit-laden engine is known as the "equilibrium octane requirement" of that engine, and this can be determined by means of a full-scale engine test.

Present day spark ignition engines having compression ratios of from about 7.5:1 to as high as 12:1 are particularly sensitive to the adverse effects associated with combustion chamber deposits. In some instances the accumulation of these deposits causes such a high equilibrium octane requirement that even the best high octane gasoline or "premium fuel" available commercially fails to eliminate knocking. The only recourse in such severe cases is to remove the engine head and scrape off the offending deposits.

Another harmful effect of combustion chamber deposits is that they tend to cause pre-ignition of the fuel, with the accompanying loss of engine power and the development of an engine noise commonly referred to as "wild ping."

The problems of high equilibrium octane requirement and pre-ignition are serious ones which have occupied considerable attention on the part of both the petroleum and automotive industries. Although the use of high quality fuels and lubricants has been found to have a slightly beneficial effect, the problems have heretofore remained largely unsolved.

It is an object of the present invention, therefore, to provide a method whereby the formation and accumulation of deleterious combustion chamber deposits in internal combustion engines can be reduced substantially.

A further object is to provide a method for combatting the problems of high equilibrium octane requirement and preignition associated with the operation of spark ignition internal combustion engines.

These and other objects of the invention are achieved in the manner described hereinafter.

According to the present invention the formation and accumulation of harmful deposits in the ferrous metal combustion chamber head of an internal combustion engine are reduced substantially by the method which comprises treating said combustion chamber head with an aqueous phosphating solution having a total acidity within the range of from about 5 to about 100 points and containing as essential ingredients the zinc ion and the phosphate ion to form thereon an integral phosphate coating of at least about 25 milligrams per square foot of surface area.

In a more particular sense, the invention relates to a method for reducing substantially the formation and accumulation of deposits in the ferrous metal combustion chamber head of a spark ignition internal combustion engine, which method comprises treating said combustion chamber head with an aqueous phosphating solution having a total acidity within the range of from about 5 to about 100 points and containing as essential ingredients from about 0.1 to about 1.0 percent by weight of zinc ion, from about 0.25 to about 2.0 percent by weight of phosphate ion, from about 0.25 to about 6.0 percent by weight of an ion selected from the group consisting of nitrate, nitrite, chlorate, perchlorate, and perborate ions, and from about 0.1 to about 3.0 percent by weight of an ion of a metal selected from the group consisting of lithium, beryllium, magnesium, calcium, strontium, cadmium, and barium to form thereon an integral phosphate coating of at least about 25 milligrams per square foot of surface area.

In a still more particular sense, the invention relates to a method for reducing substantially the formation and accumulation of deposits in the ferrous metal combustion chamber head of a spark ignition internal combustion engine, which method comprises treating said combustion chamber head with an aqueous phosphating solution having a total acidity within the range of from about 5 to about 50 points and containing as essential ingredients from about 0.3 to about 0.6 percent of zinc ion, from about 0.5 to about 1.5 percent of phosphate ion, from about 1.0 to about 4.0 percent of nitrate ion, from about 0.1 to about 0.8 percent of calcium ion to form thereon an integral phosphate coating of from about 100 milligrams to about 1000 milligrams per square foot of surface area.

In the usual practice of the invention, the ferrous metal combustion chamber is cleaned by physical and/or chemical means to remove any grease, dirt, or oxides and then it is phosphated by means of a phosphating solution which contains essentially the zinc ion and the phosphate ion.

The preparation of phosphating solutions or baths well adapted for the purpose of the present invention is set forth in co-pending applications of John A. Henricks, Serial No. 373,449, filed August 10, 1953, and Serial No. 750,279, filed June 5, 1958, both owned by the assignee of the present invention.

In view of the extensive commercial development of the phosphating art and the many journal publications and patents describing the preparation and use of phosphating solutions, it is believed unnecessary to lengthen this specification unduly by a recitation of the many ways in which the phosphating step may be accomplished. Suffice it to say that any of the commonly used phosphating techniques such as, e.g., spraying, brushing, dipping, or rolling may be employed, and that the temperature of the aqueous phosphating solution may vary within wide limits, e.g., from room temperature to 212° F. In general, best results are obtained when the phosphating solution is used at a temperature within the range of from about 150° F. to about 210° F. If desired, however, the aqueous phosphating bath may be used at higher temperatures, e.g., 225° F., 250° F., or even 300° F., by employing superatmospheric pressures.

The phosphating operation is carried out until the weight of the phosphate coating formed on the combustion chamber head is at least about 25 milligrams per square foot of surface area and is preferably within the range of about 100 to about 1000 milligrams per square foot of surface area. The time required to form the phosphate coating will vary according to the temperature, the type of phosphating solution employed, the particular technique of applying the phosphating solution, and the coating weight desired. In most instances, however, the time required to produce a phosphate coating of the weight preferred for the purpose of the present invention will be within the range of from one-quarter minute to about 15 or 20 minutes.

Specifically illustrative of phosphating solutions which have been found to be well suited for the purpose of the present invention are the following (values given are the percentages by weight of the several ions in the phosphating solution):

| Ion | Solution A | Solution B | Solution C | Solution D |
|---|---|---|---|---|
| Zn | 0.44 | 0.45 | 0.33 | 0.13 |
| $PO_4$ | 1.1 | 1.2 | 0.83 | 0.41 |
| Ca | 0.78 | 0.26 | 0.18 | 0.1 |
| $NO_3$ | 3.2 | 1.8 | 0.93 | 0.53 |
| $NH_4$ | 0.12 | 0.1 | | |
| Points total acid | 30 | 31 | 20 | 10 |

The "points total acid" referred to above is an indication of the acidity of a phosphating solution. It represents the number of milliliters of 0.1 normal sodium hydroxide solution required to neutralize a 10 milliliter sample of a phosphating solution in the presence of phenolphthalein as an indicator. Generally a total acidity of from about 5 to about 100 points, more preferably from about 5 to about 50 points, is required to obtain phosphating solutions which are capable of providing commercially satisfactory coating weights and coating speeds.

The above phosphating solutions can be made conveniently by dissolving zinc dihydrogen phosphate in water to supply the essential zinc and phosphate ions, adding calcium nitrate and, optionally, ammonium nitrate to supply calcium, nitrate, and ammonium ions, and finally adjusting the acidity of the solution by the addition of phosphoric acid and/or nitric acid.

Alternatively, the solutions can be made by dissolving zinc nitrate, calcium nitrate, calcium phosphate, and ammonium nitrate (or ammonium dihydrogen phosphate) in water, and then adjusting the acidity of the solution by the addition of phosphoric acid and/or nitric acid.

The ions of the bath used in the method of this invention may be derived from a variety of compounds and it appears to be of no consequence whether or not these ions come from different salts or acids. Regardless of the identity of the salt, for example, which provides the nitrate ion, zinc ion, or the phosphate ion, the resulting bath is effective to serve the purposes of this invention. It is necessary only that these salts or acids be used in amounts which will provide the necessary concentration of the several ions discussed above.

Solution A above was formulated, for example, by dissolving 32 grams of calcium nitrate, 6.8 grams of 75 percent phosphoric acid, 17.5 grams of zinc nitrate, and 7.9 grams of ammonium dihydrogen phosphate in sufficient water to make one liter of solution.

The effectiveness of the method of the present invention in reducing the formation and accumulation of deposits in the combustion chamber heads of internal combustion engines was determined as follows:

A pair of combustion chamber heads for a 1956 model Cadillac V-8 engine (from the General Motors Corporation) were thoroughly cleaned by immersing them for about 10 minutes in a hot (200–210° F.) aqeous cleansing bath compounded from water and 8 ounces per gallon of an aqueous alkaline cleaning composition.

The heads then were removed from the bath, washed with cold water, and phosphated on the rear half only, i.e., the area including the two rear combustion chambers, by immersing this portion in phosphating solution A for about 6 minutes at 200–210° F. The phosphated heads then were removed from the phosphating solution and rinsed with cold water. The coating weight on the phosphated portion of the heads averaged about 150 milligrams per square foot of surface area.

The phosphated heads then were affixed to a 1956 Cadillac V-8 engine equipped with a General Motors Hydramatic transmission, the output of the transmission being coupled to an eddy current dynamometer and an automatic cycling apparatus. The following cycle of engine operation was repeated continuously over a period of 157 hours:

(1) 15 seconds operation at idling speed, followed by
(2) 45 seconds operation at higher speeds, viz., acceleration through the normal shift changes of the Hydramatic transmission, reaching a terminal engine speed of 2000 r.p.m., at which point the engine develops approximately 56 horsepower in fourth gear.

The engine fuel used in the test was a standard commercial brand of premium grade leaded gasoline.

After the test was completed, the two engine heads were removed and the deposits were carefully and completely scraped from the combustion chambers and weighed:

```
                                              Deposited weight
                                                  (in grams)
Left head (front half, 2 combustion chambers,
   not phosphated) _____   14.683
Left head (rear half, 2 combustion chambers,
   phosphated) _____   12.407

Difference (a 15.2 percent reduction in de-
      posits for the phosphated combustion
      chambers) _____    2.231

Right head (front half, 2 combustion chambers,
   not phosphated _____    13.656
Right head (front half, 2 combustion chambers,
   phosphated) _____    12.209

Difference (a 10.7 percent reduction in de-
      posits for the phosphated combustion
      chambers) _____    1.447
```

Since the fuel distribution to the various cylinders of conventional carburetted gasoline engines is not absolutely uniform, a second test was carried out using another pair of engine heads, the front half of each, i.e., the area including the two front combustion chambers, having been phosphated in the manner previously described. The purpose of this test was to determine if the difference in deposits observed in the first test was due in any measure to unequal fuel distribution.

The results of the second test (16.1 percent less deposits in the phosphated portion of the left head; 13.6 percent less deposits in the phosphated portion of the right head) confirmed the results of the first test and demonstrated that the phosphate coating was indeed responsible for the observed reduction in deposits.

To measure the extent to which the phosphate coating of combustion chamber heads lowers the equilibrium octane requirement of a spark ignition engine, conventional engine heads and phosphated engine heads were compared in a full-scale engine test entitled "Cadillac V-8 Cycling Test for Evaluating Equilibrium Octane Requirement." This test employs a 1958 Cadillac V-8 engine of 365 cubic inches displacement and 10.25:1 compression ratio from which the oil filter and automatic choke have been removed and to which is coupled directly an eddy current dynamometer. The engine is operated on commercial premium grade leaded gasoline under the following conditions for a total of 132 hours, the octane requirement being determined after 60, 84, 108 and 132 test hours by comparison with standard, calibrated octane number reference fuels (known mixtures of isooctane and normal heptane):

| Test Cycle Time [1] Minutes | Engine Speed (r.p.m.) | Dynamometer load (lbs.) | Oil Temperature (° F.) | Head Temperature (° F.) | Air: Fuel Ratio |
|---|---|---|---|---|---|
| 3 | 1,400 | 33 | 185-187 | 167-173 | 13:1 to 13:5:1 |
| 1 | 500 | Idle, no load | | | |

[1] This cycle of operation is continuously repeated by means of appropriate automatic controls.

The octane requirement determination referred to above is carried out by observing when knocking first becomes perceptible with standard reference fuel under the following engine operating conditions:

Engine speed_____ 1500 r.p.m.
Intake manifold vacuum_____ 10" Hg.
Ignition timing_____ 14° before top dead center.
Head temperature_____ 180–184° F.

The average of the four octane requirement determinations referred to above is taken as the equilibrium octane requirement.

When this test was carried out using an engine fitted with conventional heads, the equilibrium octane requirement was found to be 86.6. The same test, when conducted using an engine fitted with heads which have been phosphated over their entire surface areas with solution A in the manner previously described, gave an equilibrium octane requirement of 85.3, or 1.3 octane numbers lower than the value obtained on the engine having conventional heads.

The economic significance of such a reduction in the octane requirement of engines is considerable. It has been estimated that the cost to the petroleum industry of raising the octane rating of gasoline by one octane number is of the order of one-hundred forty million dollars per year.

It is not known how the phosphate coating on the combustion chamber head acts to reduce the formation and accumulation of deposits. It may be that the deposits adhere less firmly to the phosphated surface than to the conventional ferrous surface, or it may be that the phosphate coating in some manner yet unrecognized catalyzes the oxidation of deposits, causing them to burn away.

Certain modifications in the method of this invention will be apparent to one skilled in the art and, therefore, the invention is not to be construed as being limited to the specific description thereof set forth in this specification, except as required by the appended claims.

Other modes of applying the principle of the invention may be employed, change being made as regards the details described provided the features stated in any of the following claims, or the equivalent of such, be employed.

I therefore particularly point out and distinctly claim as my invention:

1. A method for reducing the formation and accumulation of combustion deposits in the ferrous metal combustion chamber head of an internal combustion engine, which method comprises treating said combustion chamber head wth an aqueous phosphating solution having a total acidity within the range of from about 5 to about 100 points and containing as essential ingredients the zinc ion and the phosphate ion to form thereon an integral phosphate coating of at least about 25 milligrams per square foot of surface area.

2. A method for reducing the formation and accumulation of combustion deposits in the ferrous metal combustion chamber head of a spark ignition internal combustion engine, which method comprises treating said combustion chamber head with an aqueous phosphating solution having a total acidity within the range of from about 5 to about 100 points and containing as essential ingredients the zinc iron and the phosphate ion to form thereon an integral phosphate coating of at least about 25 milligrams per square foot of surface area.

3. A method for reducing the formation and accumulation of combustion deposits in the ferrous metal combustion chamber head of an internal combustion engine, which method comprises treating said combustion chamber head with an aqueous phosphating solution having a total acidity within the range of from about 5 to about 100 points and containing as essential ingredients from about 0.1 to about 1.0 percent of zinc ion, from about 0.25 to about 2.0 percent of phosphate ion, from about 0.25 to about 6.0 percent of an ion selected from the group consisting of nitrate, nitrite, chlorate, perchlorate, and perborate ions, and from about 0.1 to about 3.0 percent of an ion selected from the group consisting of lithium, beryllium, magnesium, calcium, strontium, cadmium, and barium to form thereon an integral phosphate coating of at least about 25 milligrams per square foot of surface area.

4. A method for reducing the formation and accumulation of combustion deposits in the ferrous metal combustion chamber head of a spark ignition internal combustion engine, which method comprises treating said combustion chamber head with an aqueous phosphating solution having a total acidity within the range of from about 5 to about 100 points and containing as essential ingredients from about 0.1 to about 1.0 percent of zinc ion, from about 0.25 to about 2.0 percent of phosphate ion, from about 0.25 to about 6.0 percent of an ion selected from the group consisting of nitrate, nitrite, chlorate, perchlorate, and perborate ions, and from about 0.1 to about 3.0 percent of an ion selected from the group consisting of lithium, beryllium, magnesium, calcium, strontium, cadmium, and barium to form thereon an integral phosphate coating of at least about 25 milligrams per square foot of surface area.

5. A method for reducing the formation and accumulation of combustion deposits in the ferrous metal combustion chamber head of a spark ignition internal combustion engine, which method comprises treating said combustion chamber head with an aqueous phosphating solution having a total acidity within the range of from about 5 to about 50 points and containing as essential ingredients from about 0.3 to about 0.6 percent of zinc ion, from about 0.5 to about 1.5 percent of phosphate ion, from about 1.0 to about 4.0 percent of nitrate ion, and from about 0.1 to about 0.8 percent of calcium ion to form thereon an integral phosphate coating of from about 100 milligrams to about 1000 milligrams per square foot of surface area.

6. A method in accordance with claim 5 wherein the ferrous metal combustion chamber head is treated with the aqueous phosphating solution at a temperature within the range of from about 150° F. to about 210° F. for a period of from about one-quarter minute to about 20 minutes.

References Cited in the file of this patent

UNITED STATES PATENTS

| 2,774,701 | Koryta | Dec. 18, 1956 |
| 2,859,145 | Somers et al. | Nov. 4, 1958 |

FOREIGN PATENTS

| 291,607 | Sweden | Sept. 16, 1953 |